United States Patent Office 2,993,065
Patented July 18, 1961

1

2,993,065
PIGMENT AND METHOD OF PREPARING SAME
Charles A. Kumins, Tuckahoe, Paul A. Scardaville, South Ozone Park, and Rudolf G. Frieser, Long Island City, N.Y., assignors to Interchemical Corporation, New York, N.Y., a corporation of Ohio
No Drawing. Filed Oct. 24, 1956, Ser. No. 617,919
7 Claims. (Cl. 260—439)

Our invention relates to a new nickel chelate compound and to the method of preparing it.

We have found that by causing β-naphthol to react with chloroform in an aqueous alkaline medium in the presence of orthophenylenediamine and a bivalet nickel compound, we can obtain a nickel chelate compound corresponding to the compound obtained by chelating one atom of nickel with one mole of a Schiff's base of the formula:

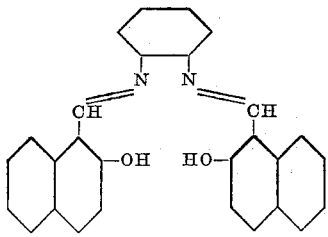

Our process can be considered as involving the following overall chemical reactions:

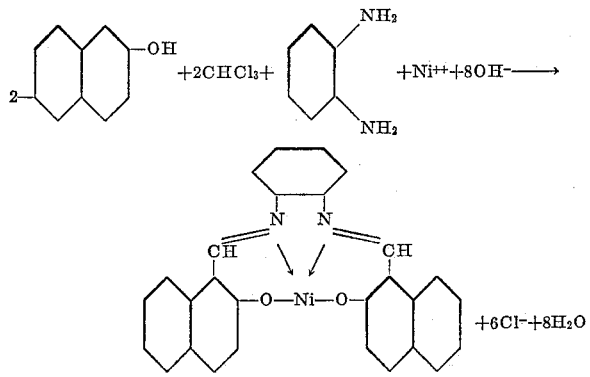

It is probable that Ni++ may exist largely as insoluble nickelous hydroxide in the alkaline reaction medium but for purposes of illustrating the present invention it will be simpler to assume the reaction takes place as illustrated.

The nickel chelate compound prepared in accordance with the invention is useful as a pigment for incorporation into resins and plastics and in protective and decorative coatings and in printing inks.

The nickel chelate compound can be obtained within a broad range of reaction conditions. Depending upon the particular reaction conditions maintained, however, we are able to vary the properties that our product will have.

The temperature may be varied between 50° C. and 110° C. A lower temperature favors the formation of a transparent pigment that will exhibit a red gold color and lesser yields, whereas a higher temperature favors the formation of an opaque product that will exhibit a slightly fluorescent red and greater yields. Advantageously, the reaction is initiated at a temperature of 60 to 65° C. or below because chloroform will reflux at 60 to 65° C. and if higher temperatures were used the reaction would have to be carried out under pressure. As the reaction mixture refluxes the temperature will begin to rise when all of the chloroform has reacted.

The time of reaction may be varied over a wide range depending upon the conditions under which the reaction is carried out. Usually two to 10 hours will be required to complete the reaction. It will be noted, however, that the preferred product, i.e. the transparent product is obtained at some optimum reaction time. This optimum reaction time will vary with changing reaction conditions but can readily be determined by continuing the reaction until the reaction mixture developes a red color resembling red iron oxide. Continuing the reaction for great lengths of time after the development of this red color will convert the product to the opaque form.

A high concentration of reactants in the aqueous reaction medium favors the formation of the transparent product, whereas a low concentration of reactants in the reaction mixture favors the formation of the slightly fluorescent red opaque product.

"Transparent pigment," or "transparent product," as used herein, refers to a pigment having a haze no greater than 30% when measured according to ASTM Method D 1003–52 (procedure B) on a film of ink on glass having dry film thickness of 0.0015 inch and prepared from an ink containing 15% pigment, 80% bodied linseed oil of 58.5 poises viscosity at 25° C. and 5% manganese drier by baking the film at 300° F. for 30 minutes.

In accordance with the process of the invention we prefer to mix the reactants in ratios of 1.1 to 2.25 moles of chloroform, 0.5 to 1.0 mole of Ni++, and 0.3 to 0.5 mole of o-phenylene diamine for each mole of β-naphthol.

The amount of alkali required is based upon the theoretical amount required to react with all of the other reactants assuming that each mole of β-naphthol reactants with one equivalent of alkali, each mole of chloroform reacts with three equivalent of alkali and each mole of soluble Ni++ compound reacts with two equivalents of alkali. Calculated on this basis the required amount of alkali ranges from one-half to twice the theoretical amount. We can use any of the alkali metal hydroxides but for preparing the transparent product we prefer to use sodium hydroxide.

The nickel salt employed can be nickelous chloride, nickelous sulfate, nickelous acetate, nickelous bromide or, in general, any water soluble salt of bivalent nickel.

In carrying out the process, the concentration of reactants is not particularly critical so far as the reaction is concerned. However, we prefer to carry out the reaction in as concentrated a reaction medium as is possible. Carrying out the reaction in concentrated solution favors formation of the product having the most desirable pigment properties, i.e. the reddish-gold transparent product. The limit so far as dilution is concerned is not critical but, as a practical matter, however, it will be appreciated that carrying out the reaction under extremely dilute conditions would be undesirable. Similarly, it will be appreciated that the reaction must be carried out in a reaction medium that is dilute enough to permit adequate agitation until the reaction is complete. We have found, in general, that good results can be obtained by employing about 0.5 to 30 liters of water per gram mole β-naphthol. The preferred transparent reddish-gold product will not be formed however, if the dilution is greater than about 1.2 liters of water per gram mole of β-naphthol.

The product of the invention is formed as a precipitated solid during the reaction and may be separated from the reaction mixture in conventional manner as by filtering.

Example 1

60 grams (0.414 mole) of β-naphthol are slurried together with 22.5 grams (0.207 mole) of ortho-phenylenediamine, 112 grams (0.94 mole) of chloroform and 234.8 grams of a 23.3% aqueous solution of $NiSO_4 \cdot 6H_2O$ (0.207 mole), then 430.8 grams of a 16.4% aqueous solution of sodium hydroxide (1.77 moles) are added, The mixture is heated to reflux and allowed to reflux at 60 to 65° C. until the temperature starts to rise. The temperature is then raised to 100–110° C. for 2 hours.

The resulting product is then removed from the reaction mixture by filtration, washed with hot water, and dried at 50° C. An 81.3% yield, based on 0.207 mole theoretical yield, is obtained.

When this product is employed as the coloring pigment in protective and decorative films, it produces opaque fluorescent red films which have excellent lightfastness, e.g. when exposed to the fadeometer for over 2000 hours, there is no breakdown in color.

Example 2

|  |  | Moles |
|---|---|---|
| A. | 100 grams β-naphthol | 0.69 |
| B. | 37.5 grams o-phenylenediamine | 0.345 |
| C. | 108.8 grams NiSO₄·6H₂O in 200 ml. of water | 0.414 |
| D. | 124 grams chloroform | 1.04 |
| E. | 371 grams NaOH in 600 ml. of water | 9.27 |

A slurry of A, B, C, and D is heated to 60° C. and while the slurry is agitated E is added dropwise, over a period of one and one-half hours while the temperature is not allowed to rise above 70° C. The temperature is then raised to 100–110° C. for two hours and the precipitated product is filtered, washed with hot water and dried at 50° C. The yield, calculated on the basis of theoretical yield obtainable from the o-phenylenediamine, is 41%. The product is a transparent pigment of reddish-gold color and, when used as the color in protective and decorative films of nitrocellulose, vinyl resin, etc., it exhibits a beautiful reddish-gold transparent appearance.

Example 3

|  |  | Moles |
|---|---|---|
| A. | 20 kilograms β-naphthol | 138 |
| B. | 24.8 kilograms chloroform | 207 |
| C. | 5.62 kilograms o-phenylenediamine | 52 |
| D. | 22.66 kilograms NiSO₄·6H₂O in 40 liters of water | 86 |
| E. | 32 kilograms NaOH in 40 liters of water | 800 |

A slurry of ingredients A through E is thoroughly agitated and heated at 50 to 55° C. for four hours. The precipitated product was separated by filtering, washed with cold water until the wash water came through colorless, and then dried at 55 to 60° C. The yield of transparent reddish-gold pigment was 66% of theoretical based on o-phenylene diamine.

Example 4

|  |  | Moles |
|---|---|---|
| A. | 100 grams β-naphthol | 0.69 |
| B. | 37.5 grams o-phenylenediamine | 0.345 |
| C. | 200 grams NaOH in 600 ml. of water | 5.0 |
| D. | 185 grams CHCl₃ | 1.55 |
| E. | 137 grams NiSO₄·6H₂O in 300 ml. of water | 0.518 |

Ingredient C is added to a stirred slurry of A, B, D and E and the stirred reaction mixture is refluxed at 60 to 65° C. until the temperature begins to rise. The temperature is then raised to 100 to 110° C. for two hours. The product is separated by filtration, washed with hot water until the wash water comes through colorless, and dried at 50° C. The yield of opaque pigment is 88% of theory based on o-phenylenediamine.

Further purification of each of the products of Examples 3 and 4 by extraction with acetone to remove soluble organic impurities, and extraction with dilute aqueous acetic acid to remove any nickel that may be present as nickel hydroxide, gives products that are identical as evidenced by color and chemical analysis. Both products corresponds in chemical analysis to the nickel chelate of one atom of nickel with one mole of Schiff's base, i.e. $C_{28}H_{18}N_2O_2Ni$.

Example 5

|  |  | Moles |
|---|---|---|
| A. | 2 kilograms β-naphthol | 13.8 |
| B. | 2.48 kilograms CHCl₃ | 20.7 |
| C. | 549 grams o-phenylenediamine | 5.2 |
| D. | 28 grams propylenediamine (dispersing agent). |  |
| E. | 3.2 kilograms NaOH in 5 liters of water | 80.0 |
| F. | 2.155 kilograms Ni(OCOCH₃)₂·4H₂O in 5 liters of water | 8.7 |

A slurry of all ingredients is stirred and heated at 50 to 55° C. for 10 hours. The reaction mixture is then diluted with 75 gallons of water and the solid product which forms is filtered off and washed with cold water until the wash water comes through colorless, and then dried at 60° C. A reddish-gold transparent product is obtained.

Example 6

|  |  | Moles |
|---|---|---|
| A. | 100 grams β-naphthol | 0.69 |
| B. | 126 grams NaOH in 200 ml. of water | 3.15 |
| C. | 100 grams CHCl₃ | 0.84 |
| D. | 121 grams NiSO₄·7H₂O in 150 ml. of H₂O | .43 |
| E. | 34 grams NaOH in 50 ml. of H₂O | 0.85 |
| F. | 28 grams o-phenylenediamine | .26 |
| G. | 1200 ml. of water. |  |

A slurry of A and B is heated with stirring to 100° C. for 10 minutes and then cooled to 40° C. Ingredients C, D, E and F are added and the stirred mixture is heated to 50–55° C. for four hours with addition of G after about 30 minutes heating to prevent gellation of the mixture. The product was filtered, washed with cold water and dried to give a yield of 86.7% of opaque pigment.

Example 7

|  |  | Moles |
|---|---|---|
| A. | 100 grams β-naphthol | 0.69 |
| B. | 124 grams CHCl₃ | 1.03 |
| C. | 26.7 grams o-phenylenediamine | .25 |
| D. | 72.9 grams NiSO₄·7H₂O + 200 ml. of H₂O | .26 |
| E. | 148 grams NaOH + 300 ml. of H₂O | 3.7 |
| F. | 1.4 grams propylenediamine (dispersing agent) | 0.02 |

All ingredients were stirred together and heated at 50–55° C. for 4 hours. The product was separated and dried as in Example 6 to give 85% yield of a reddish-gold transparent pigment.

The product of Example 7 was further purified by vacuum sublimation to give a product which corresponded in analysis with the chelate having the formula $$C_{28}H_{18}N_2O_2Ni$$

Example 8

|  |  | Moles |
|---|---|---|
| A. | 100 grams β-naphthol | 0.69 |
| B. | 37.5 grams o-phenylenediamine | 0.345 |
| C. | 185 grams CHCl₃ | 1.55 |
| D. | 181 grams NiSO₄·6H₂O+300 ml. of H₂O | 0.68 |
| E. | 192 grams NaOH+600 ml. of H₂O | 4.8 |

The procedure is similar to that of Example 4 to give a yield of 113% of theory based on the amount of o-phenylene-diamine used. The more the theoretical yield can be accounted for on the assumption that at least part of the excess nickel compound remains in the product as nickel hydroxide. The product is a lightfast opaque pigment.

Numerous examples could be given to show other variations in the product and the process of making it.

We claim:
1. The method of preparing the nickel chelate compound of a Schiff's base of the formula:

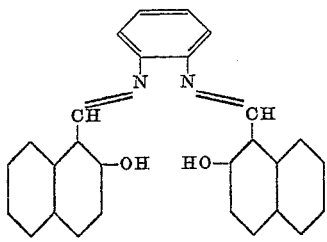

with one atom of nickel, said method comprising reacting one mole of β-naphthol in an aqueous alkaline medium with 1.1 to 2.25 moles of chloroform, 0.5 to 1.0 mole of Ni$^{++}$, 0.3 to 0.5 mole of o-phenylene diamine and from one-half to twice the theoretical amount of alkali required to react with all reactants at a temperature on the order of 50–110° C.

2. The method of claim 1 wherein the alkali is sodium hydroxide.

3. The method of claim 1 wherein the alkali is sodium hydroxide and the aqueous medium comprises no more than 1.2 liters of water for each gram mole of β-naphthol.

4. The nickel chelate compound corresponding to the formula:

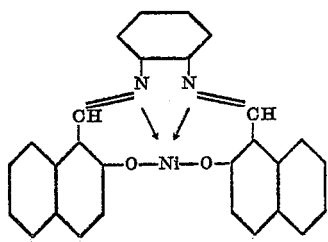

5. A transparent pigment comprising the nickel chelate compound corresponding to the formula:

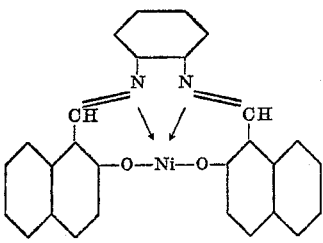

6. The method of preparing the nickel chelate compound of one mole of a Schiff's base of the formula

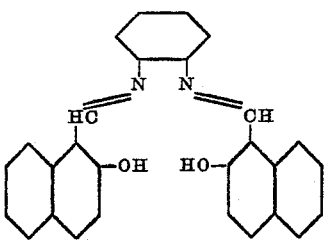

with one atom of nickel, said method comprising reacting an aqueous alkaline solution of β-naphthol with chloroform, a water soluble salt of bivalent nickel, and ortho phenylene diamine at a temperature on the order of 50–110° C.

7. A transparent pigment obtained by reacting one mole of β-naphthol in aqueous medium with 1.1 to 2.25 moles of chloroform, 0.5 to 1.0 mole of Ni$^{++}$, 0.3 to 0.5 mole of ortho phenylene diamine and from one-half to twice the theoretical amount of alkali required to react with all reactants, the dilution of the reaction medium being no greater than about 1.2 liters of water per gram mole of β-naphthol, and the reaction being continued until the reaction mixture develops a red color resembling red iron oxide.

References Cited in the file of this patent

Pfeiffer et al.: Journal für Praktische Chemie (1937), vol. 149, pages 217 to 296 (pages 247, 254 to 260 and 274 particularly relied on).

Russell and Lockhart: Organic Synthesis (1942), vol. 22, page 63.